(12) United States Patent
Harada

(10) Patent No.: US 7,351,928 B2
(45) Date of Patent: Apr. 1, 2008

(54) KEY INPUT DEVICE

(75) Inventor: Hideki Harada, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 46 days.

(21) Appl. No.: 11/296,905

(22) Filed: Dec. 8, 2005

(65) Prior Publication Data

US 2006/0290676 A1   Dec. 28, 2006

(30) Foreign Application Priority Data

Jun. 10, 2005   (JP) ............... 2005-170635

(51) Int. Cl.
  *H01H 9/02* (2006.01)
  *H01H 9/18* (2006.01)
  *H01H 13/70* (2006.01)

(52) U.S. Cl. ............... 200/302.1; 200/302.2; 200/314; 200/344

(58) Field of Classification Search ............... 200/5 A, 200/517, 341–345, 302.1–302.3, 310–317; 341/22; 345/168–170; 362/85; 400/490–496
See application file for complete search history.

(56) References Cited

U.S. PATENT DOCUMENTS

| 5,247,143 | A  | * | 9/1993  | Suwa ............... 200/517 |
| 6,166,342 | A  | * | 12/2000 | Chou ............... 200/344 |
| 6,252,184 | B1 | * | 6/2001  | Tsai et al. ............... 200/5 A |
| 6,443,644 | B1 | * | 9/2002  | Takeda et al. ............... 400/490 |
| 6,610,944 | B2 | * | 8/2003  | Lee et al. ............... 200/302.1 |
| 6,686,549 | B2 | * | 2/2004  | Douzono et al. ............... 200/341 |
| 6,971,807 | B2 | * | 12/2005 | Tsai et al. ............... 400/472 |
| 7,049,536 | B1 | * | 5/2006  | Marcus et al. ............... 200/310 |
| 7,057,125 | B1 | * | 6/2006  | Tsai ............... 200/310 |
| 7,154,059 | B2 | * | 12/2006 | Chou ............... 200/314 |

FOREIGN PATENT DOCUMENTS

JP   2005-032703   2/2005

* cited by examiner

*Primary Examiner*—Michael A. Friedhofer
(74) *Attorney, Agent, or Firm*—RatnerPrestia

(57) ABSTRACT

A key input device includes a key input unit and an illuminating unit. The key input unit has a key cap, movable mechanism, pressure sensing part, and a frame housing these components. The illuminating unit illuminates the key cap from the bottom of this key input unit through the movable mechanism and the pressure sensing part. The key input unit and the illuminating unit are configured in such a way that they are independently waterproofed.

9 Claims, 3 Drawing Sheets

KEY INPUT DEVICE

FIELD OF THE INVENTION

The present invention relates to input devices typically employed in a keyboard, which is an input unit for computers, medical appliances, and so on. In particular, the present invention relates to key input devices equipped with an illuminating unit for the use in a dark place.

BACKGROUND OF THE INVENTION

Conventional key input devices are equipped with an illuminating unit for lighting a keyboard for use in a dark place such as at night. One example of these conventional key input devices is disclosed in the Japanese Patent Unexamined Publication No. H2005-32703. This illuminated input device includes a base member, PC-board, illuminant, light guide, reflection member, pressure-sensing member, light-reducing member, and input member. The illuminated input device is configured in such a way that a light of the illuminant disposed on the PC-board is reflected on a dot pattern of the light guide, and illuminates the input keys.

In the above conventional structure, however, all members including the PC-board, illuminant, light guide, reflection member, and pressure-sensing member configured inside are sensitive to water. In order to provide a waterproof structure as a countermeasure, water needs to be completely blocked between an upper part consisting of the rubber input member and a lower part consisting of the base member so as to protect internal components from water. In addition, if the input member is made of resin, a waterproof structure cannot be provided because the input member is not integrally formed together.

SUMMARY OF THE INVENTION

A key input device of the present invention has a structure described below.

The key input device includes a key input unit and an illuminating unit. The key input unit has a key cap, a movable mechanism, a pressure sensing part, and a frame housing these components. The illuminating unit illuminates the key cap from a bottom of the key input unit through the movable mechanism and the pressure sensing part. This key input device is configured to allow waterproofing of the key input unit and illuminating unit independently.

Since the key input unit and illuminating unit of the key input device of the present invention are configured independently, these units can be waterproofed separately.

DETAILED DESCRIPTION OF PREFERRED EMBODIMENT

Exemplary embodiments of the present invention are described next with reference to drawings.

First Embodiment

Figure 1:
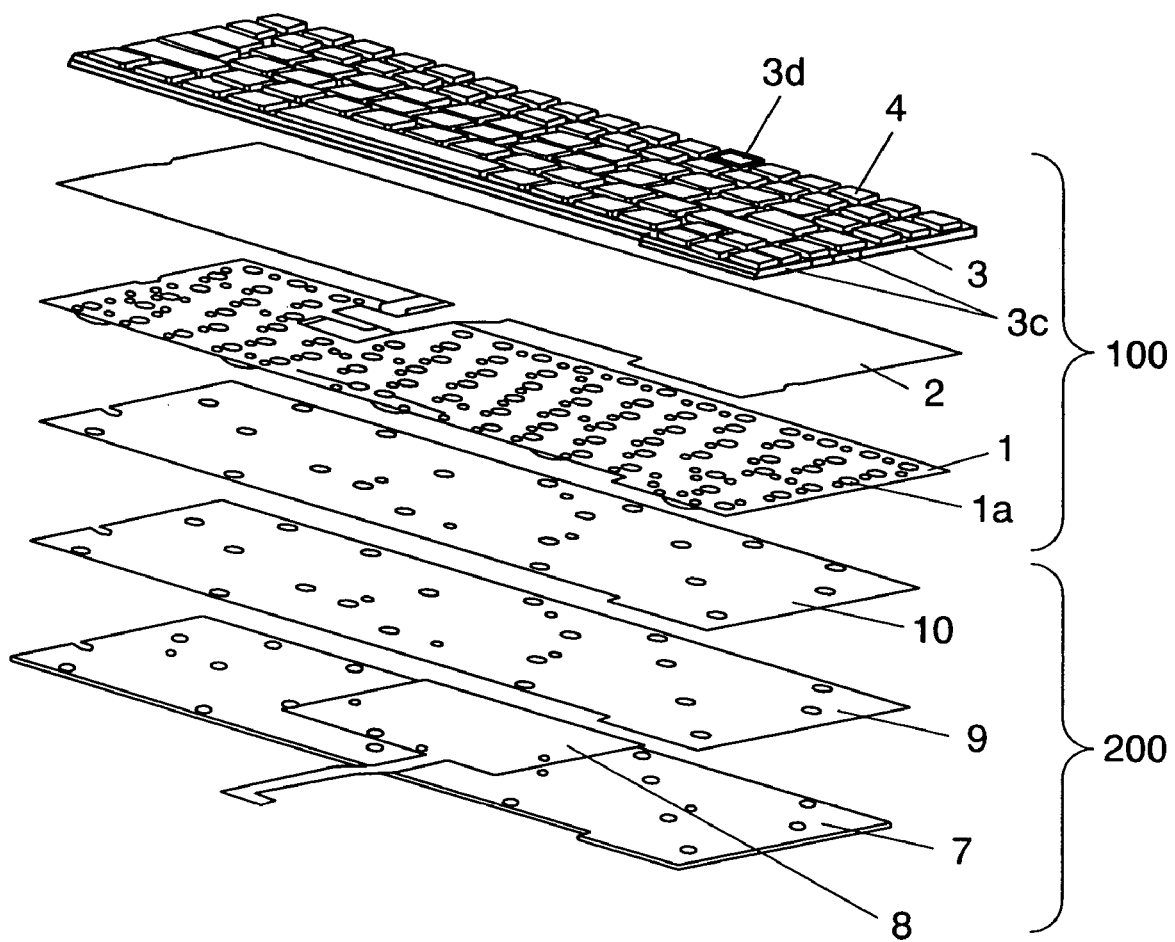
FIG. 1 is a perspective view of a structure of a key input device in accordance with a first exemplary embodiment of the present invention.
Figure 2:
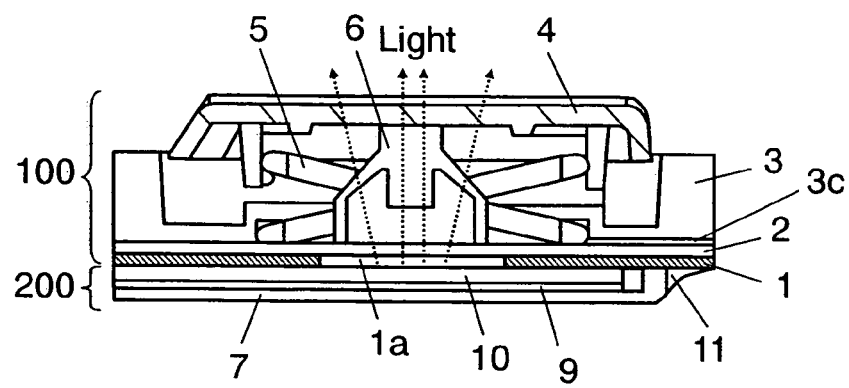
FIG. 2 is a sectional view of the structure of the key input device in accordance with the first exemplary embodiment of the present invention.

FIG. 1 is a perspective view of a structure of a key input device in the first exemplary embodiment of the present invention. FIG. 2 is a sectional view of the structure of the key input device in the first exemplary embodiment of the present invention.

In FIGS. 1 and 2, key input unit 100 includes key input unit plate 1, pressure sensing part 2, resin frame 3, key cap 4, movable mechanism 5 which vertically moves key cap 4, and elastic pressing rubber 6 which constantly pushes up key cap 4 to provide the operation feedback. Key input unit plate 1 has opening 1a. Key cap 4 has approximately transparent characters with lighttight background, or approximately transparent background with lighttight characters. Movable mechanism 5 and pressing rubber 6 are also approximately transparent. This structure allows the light of a light source entering from the bottom of key input unit 100 to illuminate key cap 4 after passing through opening 1a on key input unit plate 1, approximately transparent pressing rubber 6, and similarly transparent movable mechanism 5. Pressing rubber 6 is bonded and fixed to pressure sensing part 2.

Figure 3:
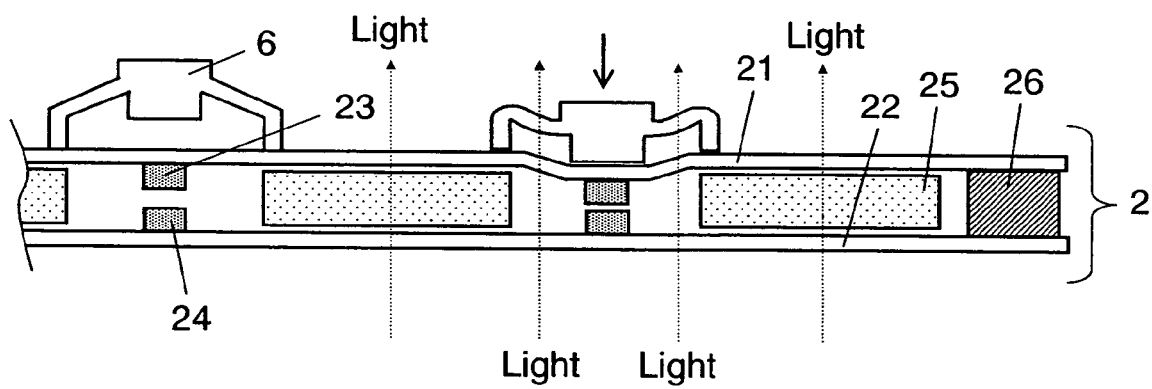
FIG. 3 is a sectional view of a structure of a pressure sensing part of the key input device in FIG. 2.

FIG. 3 is a detailed sectional view of pressure sensing part 2. In FIG. 3, pressure sensing part 2 includes approximately transparent upper sheet 21, approximately transparent lower sheet 22, and contacts 23 and 24 printed respectively on the upper and lower sheets. Contacts 23 and 24 are coupled to copper foil patterns (not illustrated) are respectively printed on the upper and lower sheets and led outside from pressure sensing part 2 as a signal line. Approximately transparent insulating sheet 25 is also disposed between the upper and lower sheets. When pressing rubber 6 is depressed by pressure, contact 23 and contact 24 touch, and a key entry is established. Accordingly, pressure sensing part 2 is configured with a light-transmitting material except for contacts 23 and 24 and copper foil patterns (not illustrated) respectively printed on the upper and lower sheets.

Frame 3 and key input unit plate 1 are coupled such as by welding, and they secure movable mechanism 5 and pressure sensing part 2. Movable mechanism 5 secures key cap 4 typically by a claw hook.

In this structure of key input unit 100, only pressure sensing part 2 needs to be waterproofed. Waterproof seal 26 is applied along the entire periphery between upper sheet 21 and lower sheet 22, and is bonded such as by adhesive. All openings (not illustrated) provided on upper sheet 21 and lower sheet 22 are also sealed such as by applying adhesive around the openings so as to prevent water from entering through these openings. Accordingly, pressure sensing part 2 is reliably waterproofed.

Still more, in key input unit 100, a drain groove (not illustrated) is provided in each key structure of frame 3. Still more, key input unit 100 has multiple drain outlets 3c on the periphery of frame 3. The groove in each key and drain outlets 3c on the periphery are connected. This structure allows water entering inside key input unit 100, such as by spilling a drink over the keyboard top, to be easily drained from drain outlets 3c. Furthermore, erroneous operation preventive frame 3d is provided on a predetermined key.

In FIG. 1, illuminating unit 200 includes illuminating unit plate 7, printed circuit board 8, reflection sheet 9, and light guide 10. In these components, printed circuit board 8 involves electrical signals, and thus is sensitive to water and dew condensation. Printed circuit board 8 is therefore sandwiched, together with reflection sheet 9 and light guide 10, between key input unit plate 1 and illuminating unit plate 7. Waterproof sealant 11 is applied to the entire periphery of both plates 1 and 7 so as to prevent water from entering inside.

Since key input unit plate 1, which is a component of key input unit 100, and illuminating unit plate 7, which is a component of illuminating unit 200, are coupled, key input unit 100 and illuminating unit 200 become integrated.

Figure 4A:
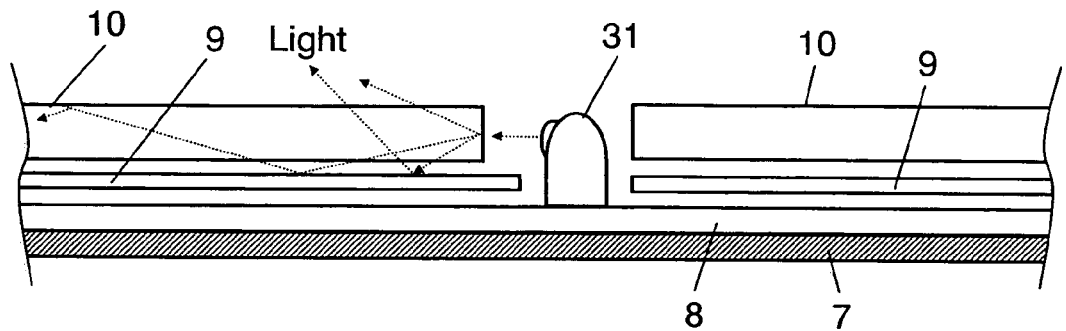
FIG. 4A is a sectional view of a structure of an illuminating unit of the key input device in FIG. 2.
Figure 4B:
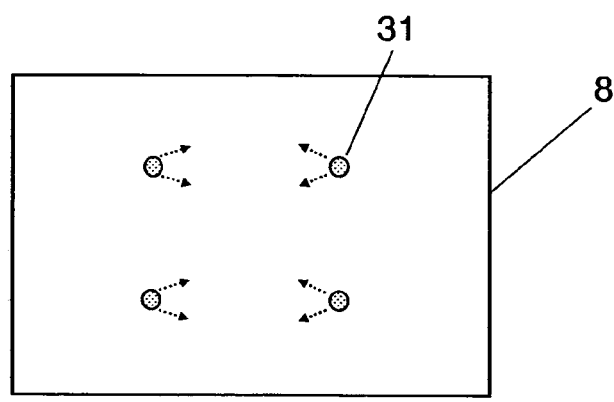
FIG. 4B is a top view of a printed circuit board in the illuminating unit of the key input device in FIG. 2.

FIG. 4A is a magnified sectional view of illuminating unit 200, and FIG. 4B is a top view of printed circuit board 8. As shown in both drawings, multiple illuminants 31 are disposed on printed circuit board 8. These illuminants 31 are configured to emit light in a horizontal direction as shown by the arrow in the drawings. Reflection sheet 9 prevents this outgoing light from leaking downward. The outgoing lights from illuminants 31 reflect on light guide 10, pass through opening 1a on plate 1, and illuminate key cap 4. Opening 1a on plate 1 is transparent and transmits light, but there is no physical hole. Accordingly, plate 1 has a structure not to pass through water.

In the above structure, components are secured with frame 3 and key input unit plate 1 in key input unit 100. Accordingly, key input unit 100 can be used independently without an illuminating feature. In this case, only pressure sensing part 2 needs to be waterproofed.

A key input device with illuminating unit can be easily configured by adding separate illuminating unit 200 to key input unit plate 1 disposed at the bottom of key input unit 100 which is independently usable.

In the first exemplary embodiment, frame 3 is provided on key input unit 100. However, movable mechanism 5 may also be secured with key input unit plate 1.

In illuminating unit 200, LED (light-emitting diode) is used as illuminants 31. Instead, EL (electro luminescence) may also be used. Still more, a structure to provide LED to each key so as to omit a part of printed circuit board 8, reflection sheet 9, and light guide 10 is also feasible.

Second Embodiment

Figure 5:
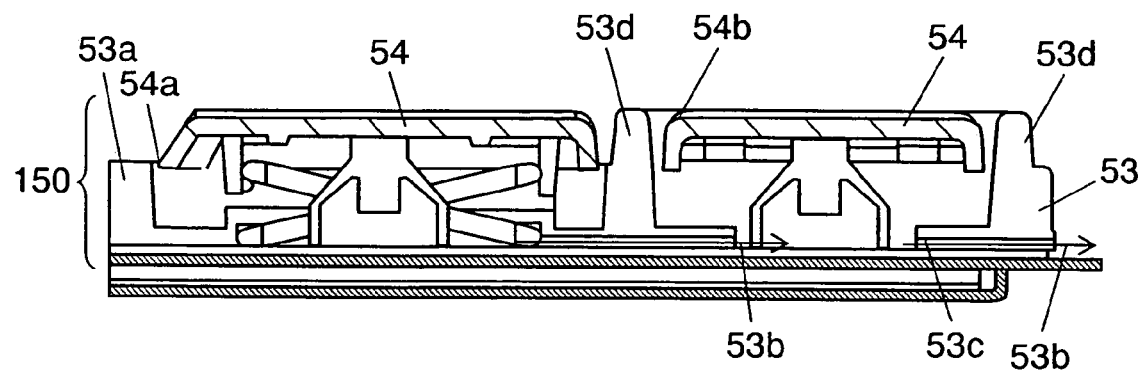
FIG. 5 is a sectional view of a structure of a key input device in accordance with a second exemplary embodiment of the present invention.

FIG. 5 is a sectional view of a key input device in the second exemplary embodiment of the present invention. In FIG. 5, resin frame 53 in key input unit 150 includes sub-frame 53a around each of key caps 54. The height of these sub-frames 53a is equivalent or slightly higher than edges 54a of key caps 54.

Still more, groove 53b is provided in every key structure of frame 53 in key input unit 150. Still more, key input unit 150 is provided with multiple drain outlets 53c on the periphery of frame 53. Groove 53b on each key and drain outlets 53c on the periphery are connected. Furthermore, erroneous operation preventive frame 53d is provided on a predetermined key in resin frame 53 which provides sub-frame 53a around all key caps 54. This frame 53d extends near to top face 54b of key cap 54, and has about the same height.

The above structure prevents fingers and objects from easily touching the edge of key cap because sub-frame 53a is provided on the periphery of each of key caps 54 and the height of sub-frame 53a is made approximately the same as edges 54a of key caps 54. Accordingly, key input unit 150 is protected from damage such as detachment of key caps.

Erroneous operation preventive frame 53d is also provided around a predetermined key of frame 53, and this frame 53d extends to about the same height as top face 54b of key cap 54. This also prevents fingers and objects from easily touching the key cap. If the key provided with erroneous operation preventive frame 53d is used as a special key which is operated only at emergency occasions, for example, erroneous operation of the key which should not be normally used is preventable.

Furthermore, groove 53b provided in each key structure of frame 53 and drain outlets 53c on the periphery of frame 53 facilitate draining of water from these drain outlets 53c when water enters inside key input unit 150 such as by spilling a drink over the key top.

What is claimed is:

1. A key input device comprising:
    a key input unit including a key cap, a movable mechanism, a pressure sensing part, a plate and a frame housing the movable mechanism and the pressure sensing part; and
    an illuminating unit illuminating the key cap from a bottom of the key input unit through the movable mechanism and the pressure sensing part,
    wherein, the plate is disposed between the pressure sensing part and the illuminating unit,
    wherein the key input unit and the illuminating unit are configured in such a way that they are independently waterproofed,
    wherein a first waterproof seal is applied to a surface of the plate and a surface of the illuminating unit, the surface of the plate extending away from the surface of the illuminating unit, and
    wherein the pressure sensing part includes an upper sheet and a lower sheet which include respective contacts facing each other, and a second waterproof seal is applied to a periphery between the upper sheet and the lower sheet.

2. The key input device as defined in claim 1, wherein the key input unit is usable without illumination separately from the illuminating unit.

3. The key input device as defined in claim 1, wherein the movable mechanism and the pressure sensing part are made of a material that transmits light.

4. The key input device as defined in claim 1, wherein the key input unit further comprises a pressing rubber, and a pressing force on the key cap is transmitted to the pressure sensing part via the pressing rubber.

5. The key input device as defined in claim 1, wherein the frame has a plurality of drain outlets on a periphery of the frame.

6. The key input device as defined in claim 5, wherein the frame further comprises a drain groove in each key input unit, and the drain groove and the drain outlets on the periphery are connected.

7. The key input device as defined in claim 1, wherein the illuminating unit has a waterproof sealant on an entire periphery of the illuminating unit.

8. The key input device as defined in claim 1, wherein the frame has a sub-frame around the key cap, and a height of the sub-frame is set to be equivalent to or higher than a height of an edge of the key cap.

9. The key input device as defined in claim 1, wherein the pressure sensing part includes an insulating sheet between the upper sheet and lower sheet and the second waterproof seal is spaced apart from the insulating sheet.

* * * * *